United States Patent [19]

Tanahashi

[11] Patent Number: 4,975,897
[45] Date of Patent: Dec. 4, 1990

[54] READING CIRCUIT FOR AN OPTICAL INFORMATION STORING APPARATUS

[75] Inventor: Yutaka Tanahashi, Tokyo, Japan

[73] Assignee: NEC Corporation, Tokyo, Japan

[21] Appl. No.: 259,636

[22] Filed: Oct. 19, 1988

[30] Foreign Application Priority Data

Oct. 19, 1987 [JP] Japan .................................. 62-261813

[51] Int. Cl.$^5$ ............................ G11B 7/60; G11B 5/09
[52] U.S. Cl. .......................................... 369/59; 360/46
[58] Field of Search ....................... 369/59; 360/40, 41, 360/46

[56] References Cited

U.S. PATENT DOCUMENTS 4,688,204 8/1987 Noyes, Jr. et al. .................... 369/59

Primary Examiner—Vincent P. Canney
Attorney, Agent, or Firm—Sughrue, Mion, Zinn, Macpeak & Seas

[57] ABSTRACT

A circuit applicable to an optical disk apparatus or similar optical information storing apparatus for reading out information being stored. A differentiated signal produced by differentiating an analog signal read out is compared with a predetermined threshold value to produce a leading edge level signal and a trailing edge level signal which are respectively the results of comparison performed in a polarity immediately before a peak of the analog signal and a polarity immediately after the peak. The leading edge level signal is delayed by a predetermined period of time and then compared with a peak signal for coincidence. The result of this comparison is further delayed by a predetermined period of time and then compared with the trailing edge level signal for comparison to deliver the result as read out data.

7 Claims, 3 Drawing Sheets

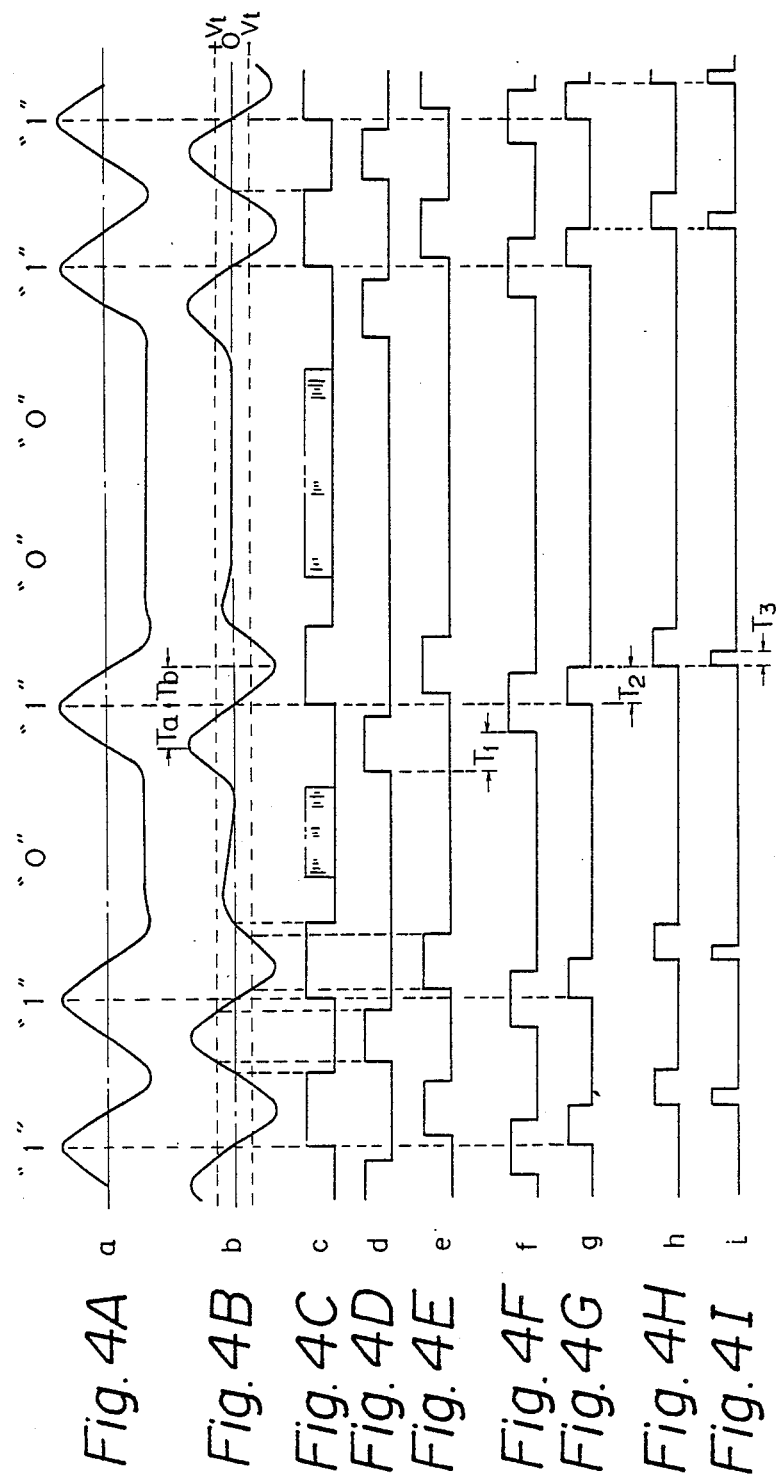

READING CIRCUIT FOR AN OPTICAL INFORMATION STORING APPARATUS1

BACKGROUND OF THE INVENTION

The present invention relates to a reading circuit suitable for use with an optical disk apparatus or similar optical information storing apparatus and, more particularly, to a reading circuit of the type producing read out data in the form of a digital binary signal be detecting peaks of an analog signal, or information read out of a recording medium, by a stored information detecting device.

In an optical storing appartatus such as an optical disk apparatus, a storing medium implemented as an optical disk is illuminated by a laser beam which is regulated into a small spot, and light relfected from the disk is changed in intensity depending upon the present/absence of a pit, or stored information, on the disk surface. An optical sensor is installed in the apparatus to sense such a change in the intensity of reflection to produce an analog signal. This analog signal has a waveform which contains information at its peaks which are individually associated with the centers of the pits on the disk. Hence, use is made of a reading cirucit which is so constructed as to produce read out data in the form of a digital signal by detecting the peaks of the analog signal.

Typical of implementations for detecting the peaks heretofore proposesd is the combination of a differentiating circuit and a zero-crossing comparing circuit. The differentiating circuit differentiates the analog signal while the zero-crossing comparing circuit detects the points where the differentiated analog signal crosses the zero level. A drawback with such an implementation is that high-frequency noise increases due to particular frequency characteristics of the differentiating circuit and, in addition, the signal-to-noise (S/N) ratio of an analog signal of the kind described is limited. In light of this, the reading circuit is also provided with a level detecting function adapted to check the amplitude of the signal for thereby eliminating erroneous detection of data due to baseline noise. More specifically, the reading circuit produces read out data on the basis of coincidence of a peak detection output and a level detection output. A conventional approach for such level detection is differentiating the analog signal in two consecutive steps and comparing the level of the resulting signal with a pedetemined threshold voltage level. Such an approach is substantially immune to the influence of envelope fluctuations ascribable to low frequency components contained in the analog signal and implements the level detection by a relatively simple circuit construction.

However, the prior art scheme for level detection discussed above has a drawback that since it is the analog signal undergone a double differentiation that is used for the detection of levels, high-frequency noise is increased beyond the signal undergone a single differentiation for peak detection due to the particular characteristics of the differentiating circuit. Consequently, data ONEs are apt to be erroneously detected at ZERO data positions where no pits exist, owing to the baseline noise. Erroneous detection due to noise is further aggravated because the double differentiated signal is used in undershoot waveform portions of the analog signal which are derived from the diffraction effect particular to pits and/or from the characteristic of a low-pass filter included in an amplifying circuit.

SUMMARY OF THE INVENTION

It is therefore an object of the present invention to provide a reading circuit for an optical information storing apparatus which eliminates erroneous detection of data due to baseline noise.

It is another object of the present invention to provide a generally improved reading circuit for an optical information storing apparatus.

A circuit for a storing apparatus for producing read out data in the form of a digital binary signal by reading information out of a storing medium by an information detecting device and detecting peaks of an analog signal associated with the information read out of the present invention comprises a differentiating circuit for differentiating the analog signal to produce a differentiated signal, a level detecting circuit for comparing a level of the differentiated signal with a zero level and a predetermined threshold level, producing a peak signal when the differentiated signal crosses the zero level, producing a leading edge level signal when the differentiated signal of a polarity which has occured immediately before the peak signal has a level higher than the threshold level in terms of absolute value, and producing a trailing edge level signal when the differentiated signal of a polarity which has occurred immediate after the peak signal has a level higher than the threshold level in terms of absolute value, a first delay line for delaying the leading edge level signal by a predetermined period of time to produce a delayed leading edge level signal, a first decision circuit for determining a coincidence of the peak signal and the delayed leading edge level signal to produce a leading edge level decision signal, a second delay line for delaying the leading edge level decision signal by a predetermined period of time to produce a delayed leading edge level decision signal, and a second decision circuit for determining a coincidence of the delayed leading edge level decision signal and the trailing edge level signal to produce the read out data.

BRIEF DESCRIPTION OF THE DRAWINGS

The above and other objects, features and advantages of the present invention will become more apparent from the following detailed description taken with the accompanying drawings in which:

FIGS. 4A to 4I are waveform diagrams useful for understanding the operations of various sections which are included in the circuit of FIG. 3.

DESCRIPTION OF THE PREFERRED EMBODIMENT

Figure 1:
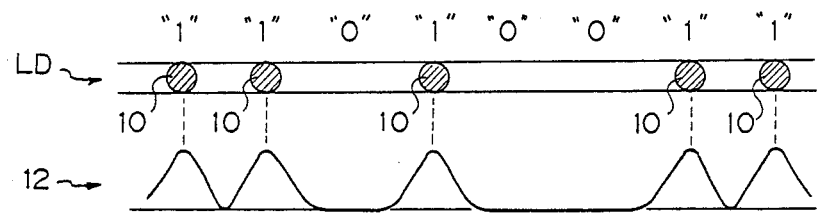
FIG. 1 is a schematic diagram representative of a relationship between pits which are provided on a storing medium and an analog signal associated with the pits.
Figure 2A:
FIGS. 2A to 2C are waveform diagrams representative of an analog signal which is used to discuss a prior art information reading procedure.
Figure 2B:
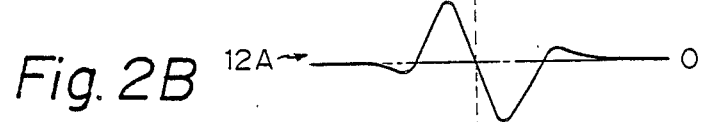
Figure 2C:
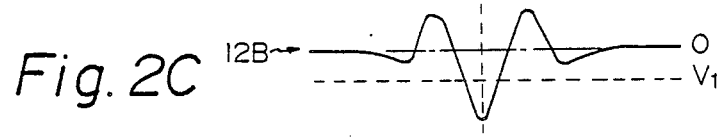

Referring to FIG. 1 of the drawings, there are shown pits 10 formed on the surface of an optical disk LD which serves as a storing medium for an optical disk apparatus or similar optical storing apparatus, and the waveform of an analog signal 12 associated with the pits 10 which are sensed by an optical sensor. As shown the analog signal 12 is outputted as data of (logical) ONE when any pit 10 is sensed and as data of (logical) ZERO when no pits 10 are sensed, information being contained in the peaks of the waveform which are individually associated with the pits 10. To read data out of the disk LD, the analog signal 12 is converted into a digital signal by detecting the peaks of the signal 12, i.e., by differentiating the analog signal 12 and then detecting zero-crossing points of the resulting signal. It has been customary to check the amplitude of the signal to detect its levels so that detection errors ascribable to baseline noise may be eliminated, as stated earlier. More specifically, the analog signal (FIG. 2A) sensed by an optical sensor is differentiated once to transform it into an analog signal 12A as shown in FIG. 2B and, then, the analog signal 12A is further differentiated to produce an analog signal 12B as shown in FIG. 2C. This is followed by comparing the levels of the analog signal 12B with a predetermined threshold voltage $V_1$. Labeled 12a in FIGS. 2A to 2C is an undershoot waveform portion of the analog signal 12.

With such a prior art level detecting procedure, however, since the analog signal 12B undergone a double differentiation is used for the detection of levels, high frequency noise is increased beyond the signal 12A undergone a single differentiation for level detection due to the particular characteristics of the differentiating circuit, as discussed earlier. Consequently, data ONEs are apt to be erroneously detected at ZERO data positions where no pits exist as shown in FIG. 1, owing to the baseline noise. Erroneous detection due to noise is further aggravated because the double differentiated signal 12B is used in the undershoot waveform portions 12a, FIG. 2A, of the analog signal 12 which are derived from the diffraction effect particular to pits and/or from the characteristics of a low-pass filter included in an amplifying circuit.

Figure 3:
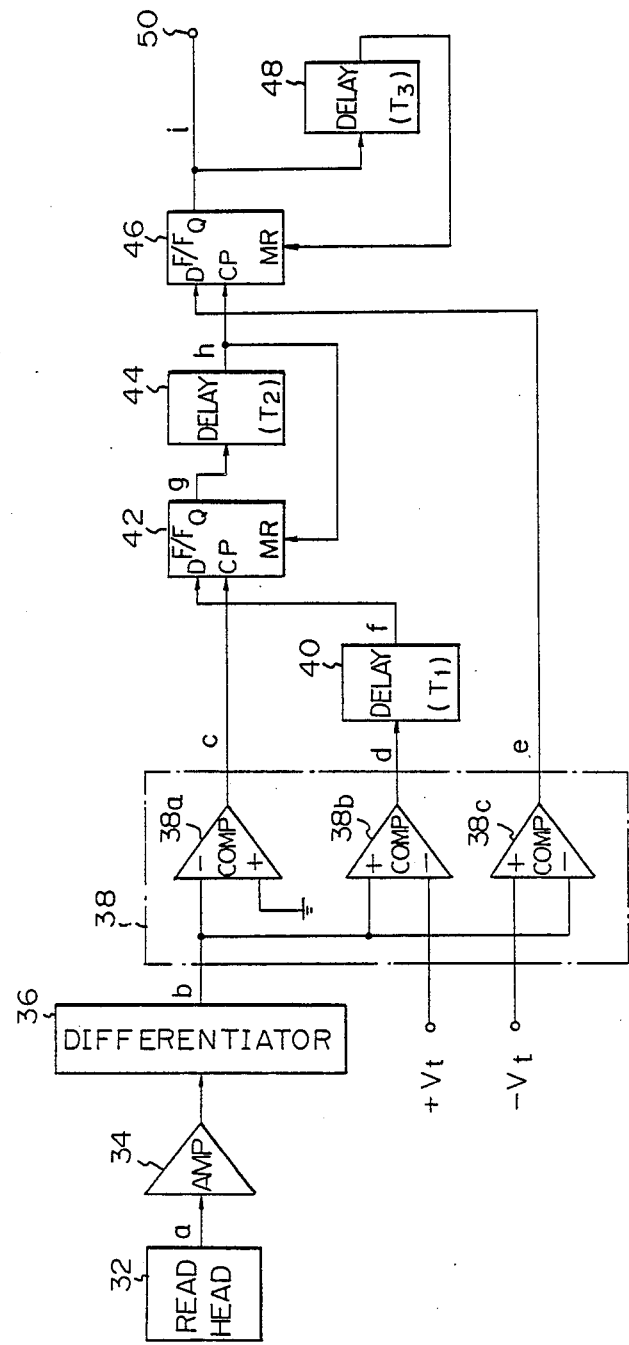
FIG. 3 is a schematic block diagram showing a reading circuit for an optical information reading apparatus embodying the present invention.

Referring to FIG. 3, an information reading circuit embodying the present invention is shown and generally designated by the reference numeral 30. In the figure, an analog signal a (FIG. 4A) read out by an optical read head 32 is amplified by an amplifier (AMP) 34 and then applied to a differentiator 36. The differentiator 32 differentiates the input signal a to produce a differentiated signal b (FIG. 4B). A level detector 38 is made up of comparators (COMPs) 38a to 38c. The comparator 38a compares the output signal b of the differentiator 36 with zero level while the comparators 38b and 38c compare the signal b with predetermined threshold levels +Vt and −Vt, respectively. When the differentiated signal b crosses the zero level, the comparator 38a produces a peak signal c (FIG. 4C). When the signal b of a polarity which has occurred immediately before the leading edge of the peak signal c has a level higher than the threshold level +Vt in terms of absolute value, the comparator 38b produces a leading edge level signal d (FIG. 4D). Further, when the signal b of a polarity which has occurred immediately after the leading edge of the peak signal c has a level higher than the threshold level −Vt in tems of absolute value, the comparator 38c produces a trailing edge level signal e (FIG. 4E). A delay line 40 having a delay time of $T_1$ constitutes delay means for delaying the leading edge level signal d by a predetermined period of time to output a delayed leading edge level signal f (FIG. 4F). A D-type flip-flop 42 serves as first decision means which delivers a leading edge level decision signal g (FIG. 4G) when detected a coincidence of the peak signal c and the delayed leading edge level signal. A delay line 44 having a delay time of $T_2$ plays the role of delay means for delaying the decision signal g from the decision means 44 by a predetermined period of time to produce a delayed leading edge level decision signal h (FIG. 4H). A D-type flip-flop 46 constitutes a second means which outputs read out data i (FIG. 4I) when detected a coincidence of the decision signal h and the trailing edge level signal e. Further provided are a delay line 48 having a delay time of $T_3$, and an output terminal 50 on which the read out data i appears.

In operation, the analog signal a reproduced by the optical read head 32 is amplified by the amplifier 34 becuase it is inherently weak. The output of the amplifier 34 is fed to the differentiator 36 to be differentiated thereby with respect to time. Therefore, the differentiated signal b coming out of the differentiator 36 has zero-crossing points which are individually associated with the peaks of the analog signal a. The differentiated signal b is routed to one input terminal of each of the comparators 38a to 38c of the level detector 38. Receiving the zero level at the other input terminal, the comparator 38a produces the peak c, i.e., a logical signal assuming a ONE or a ZERO every time the signal b crosses the zero level. More specifically, a positive peak of the analog signal a which is representative of data ONE is detected in terms of a change of the peak signal c from a ZERO to a ONE. The comparators 38b and 38c receive at their other input terminal the positive and negative threshold voltges $+V_t$ and $-V_t$, respectively. Hence, the leading edge level signal d outputted by the comparator 38b is a logical signal which becomes a ONE when the differentiated signal $V_t$ is higher than the threshold level $+V_t$, and the trailing edge level signal e outputted by the comparator 38c is a logical signal which becomes a ONE when the signal b is lower then the threshold level $-V_t$. In this manner, the comparator 38b performs comparison at the positive polarity which is the polarity of the differentiated signal b immediately before a change of the peak signal c from a ZERO to a ONE, and the comparator 38c performs comparison at the negative polarity which is the polarity of the signal b immediately after a change of the peak signal c from a ZERO to a ONE.

The leading edge level signal d is delayed by the $T_1$ delay line 40 to become the delayed leading edge level signal f which is then fed to a D input terminal of the D-type flip-flop 42. Receiving the peak signal c at a clock input terminal CP, the flip-flop 42 determines whether the signal f is present at a point of change of the peak signal c from a ZERO to a ONE. When the peak signal c and the delayed leading edge level signal f coincide with each other, the D-type flip-flop 42 produce the leading edge level decision signal g. This signal g is delayed by the $T_2$ delay line 44 to become the delayed leading edge level decision signal h. The decision signal h is applied to a reset input teminal MR of the D-type flip-flop 42 to reset the leading edge level decision signal g and, at the same time, it is applied to a clock input terminal CP of the D-type flop-flop 46 to see if the trailing edge level signal e is present on a D input terminal of the flip-flop 46 at the leading edge of the signal h. The flip-flop 46 produces the readout data i when decided that these signals h and e are coincident. Adapted to determine the pulse width of the read out data i, the delay line 48 delays the information i by the predetermined period of time $T_3$ and then resets the flip-flop 46 to thereby provide a pulse width of $T_3$.

With the illustrative embodiment shown and described, it is possible to achieve the greatest noise discrimination effect by equalizing the delay time $T_1$ of the delay line 40 and an interval $T_a$ between the positive peak and the zero-crossing point of the differentiated signal b and be equalizing the delay time $T_2$ of the delay line 44 and an interval $T_b$ between the zero-crossing point and the negative peak. While the positive and negative threshold levels $+V_t$ and $-V_t$ have been assumed to be the same in absolute value, they may be different from each other. In the case that the analog signal a has a waveform which has negative peaks in association with data ONEs in contrast to the waveform of FIG. 4A, it is only necessary to replace the positive and negative input polarities of the comparator 38a with each other, to implement the trailing edge level signal by the output of the comparator 38b, and to implement the leading edge level signal by the output of the comparator 38c.

In summary, it will be seen that the present invention provides a reading circuit of the type producing read out information on the basis of coincidence of a peak detecting condition and a level detecting condition, which circuit eliminates erroneous data readout ascribable to baseline noise and thereby enhances the read error margin. This unprecedented advantage is derived from a sequence of steps of comparing a differentiated signal produced by differentiating a read out analog signal with predetermined threshold values to output a leading edge and a trailing edge level signal which are respectively the results of comparison performed in a polarity immediately before a peak of the analog signal and in a polarity immediately after the same, checking the leading edge level signal undergone a predetermined time of delay and a peak signal for their coincidence, further delaying the result of such decision by a predetermined period of time, checking the resulting signal and the trailing edge level signal for coincidence, and delivering a result representative of their coincidence as read out data.

Various modifications will become possible for those skilled in the art after receiving the teachings of the present disclosure without departing from the scope thereof.

What is claimed is:

1. A circuit for a storing apparatus for producing read out data in the form of a digital binary signal by reading information out of a storing medium by information detecting means and detecting peaks of an analog signal associated with the information read out, comprising:

differentiating means for differentiating the analog signal to produce a differentiated signal;

level detecting means for comparing a level of the differentiated signal with a zero level and a predetermined threshold level, producing a peak signal when the differentiated signal crosses the zero level, producing a leading edge level signal when the differentiated signal of a polarity which has occurred immediately before the peak signal has a level higher than the threshold level in terms of absolute value, and producing a trailing edge level signal when the differentiated signal of a polarity which has occured immediate after the peak signal has a level higher than the threshold level in terms of absolute value;

first delay means for delaying the leading edge level signal by a predetermined period of time to produce a delayed leading edge level signal;

first decision means for determining a coincidence of the peak signal and the delayed leading edge level signal to produce a leading edge level decision signal;

second delay means for delaying the leading edge level decision signal by a predetermined period of time to produce a delayed leading edge level descision signal; and second decision means for determining a coincidence of the delayed leading edge level decision signal and the trailing edge level signal to produce the read out data.

2. A circuit as claimed in claim 1, wherein said level detecting means comprises a first comparator for producing the peak signal, a second comparator for producing the leading edge level signal, and a third comparator for producing the trailing edge level signal.

3. A circuit as claimed in claim 1, wherein said first delay means and said second delay means comprises a delay line each.

4. A circuit as claimed in claim 1, wherein said first decision means and said decision means comprises a D-type flip-flop each.

5. A circuit as claimed in claim 1, further comprising third delay means for delaying the read out data by a predetermined period of time to determine a pulse width of the read out data.

6. A circuit as claimed in claim 5, wherein said third delay means comprises a delay line.

7. A circuit as claimed in claim 1, wherein said storing apparatus comprises an optical storing apparatus, said storing medium comprising an optical disk, said information detecting means comprising an optical read head.

* * * * *

UNITED STATES PATENT AND TRADEMARK OFFICE
CERTIFICATE OF CORRECTION

PATENT NO. : 4,975,897

DATED : December 4, 1990

INVENTOR(S) : Tutaka Tanahashi

It is certified that error appears in the above-identified patent and that said Letters Patent is hereby corrected as shown below:

Col. 1, line 10, delete "be" and insert -- by --;

Col. 1, line 26 delete "cirucit" and insert -- circuit --;

Col. 5, line 8 delete "be" and insert -- by --.

Signed and Sealed this

Twenty-eighth Day of July, 1992

Attest:

DOUGLAS B. COMER

Attesting Officer     Acting Commissioner of Patents and Trademarks